United States Patent [19]

Martinez et al.

[11] Patent Number: 5,531,027
[45] Date of Patent: Jul. 2, 1996

[54] HEDGE TRIMMER DRIVE ASSEMBLY

[75] Inventors: David M. Martinez, Williamsport, Pa.; Erich Edlinger, Tucson, Ariz.

[73] Assignee: McCulloch Corporation, Tucson, Ariz.

[21] Appl. No.: 278,654

[22] Filed: Jul. 21, 1994

[51] Int. Cl.⁶ .................................................. B26B 15/00
[52] U.S. Cl. ........................................... 30/216; 30/228
[58] Field of Search ........................... 30/210, 216, 228, 30/122, 500, 392, 393, 277.4

[56] References Cited

U.S. PATENT DOCUMENTS

| | | |
|---|---|---|
| 109,479 | 11/1870 | Wilson . |
| 1,221,292 | 4/1917 | Cribbs . |
| 1,370,269 | 3/1921 | Beach . |
| 1,919,516 | 7/1933 | Koch . |
| 1,980,865 | 11/1934 | Kauffman . |
| 2,243,641 | 5/1941 | Miller .................................. 30/210 |
| 3,083,457 | 4/1963 | Ottosen et al. ....................... 30/216 |
| 3,200,493 | 8/1965 | Dodegge ............................... 30/216 |
| 3,212,188 | 10/1965 | Riley, Jr. et al. ..................... 30/216 |
| 3,431,647 | 3/1969 | Scott .................................... 30/210 |
| 3,579,827 | 5/1971 | Grahn ................................... 30/144 |
| 3,699,655 | 10/1972 | Taylor et al. ......................... 30/216 |
| 3,757,194 | 9/1973 | Weber et al. ........................... 320/2 |
| 3,774,302 | 11/1973 | Ketchpel, Jr. et al. ................ 30/216 |
| 3,802,075 | 4/1974 | Taylor et al. ......................... 30/216 |
| 3,902,243 | 9/1975 | Klebe, Jr. .............................. 30/220 |
| 3,909,943 | 10/1975 | Buschman ............................ 30/216 |
| 4,048,722 | 9/1977 | Howard ............................ 30/122 X |
| 4,321,838 | 3/1982 | Feldman .......................... 30/122 X |
| 4,619,045 | 10/1986 | Mayer ................................... 30/216 |
| 4,827,616 | 5/1989 | Sistare ................................... 30/210 |
| 4,926,556 | 5/1990 | Pilatowicz et al. ................... 30/216 |
| 5,058,276 | 10/1991 | Parker ................................... 30/228 |
| 5,079,841 | 1/1992 | Ohkanda et al. ..................... 30/216 |
| 5,155,914 | 10/1992 | Ohkanda ............................... 30/369 |
| 5,271,154 | 12/1993 | Ohkanda ............................... 30/216 |

*Primary Examiner*—Douglas D. Watts
*Attorney, Agent, or Firm*—Marshall, O'Toole, Gerstein, Murray & Borun

[57] ABSTRACT

A hedge trimmer having a hedge trimmer housing, a motor disposed in the hedge trimmer housing and a drive assembly associated with the motor. The drive assembly includes a first housing, a first gear connected to the rotatable drive shaft of the motor, a second housing, a second gear associated with the second housing, the second gear being in contact with the first gear so that the second gear rotates when the first gear rotates, and a support connector for causing the first and second housings to maintain a fixed positional relationship to ensure that the first and second gears remain in contact. The hedge trimmer also includes a first cutting blade operatively coupled to the second gear so that the first cutting blade reciprocates when the second gear rotates and a second cutting blade movable relative to the first cutting blade. The hedge trimmer may also include a gear-travel limit member to prevent any substantial misalignment of the second gear with respect to the first gear.

11 Claims, 4 Drawing Sheets

HEDGE TRIMMER DRIVE ASSEMBLY

BACKGROUND OF THE INVENTION

The present invention is directed to a hedge trimmer drive assembly of the type used to drive one or more reciprocating blades in a hedge trimmer.

A typical hedge trimmer may have a motor with a rotating drive shaft, a relatively small gear connected to the drive shaft, a relatively large gear in contact with and driven by the small gear, a gear box housing for enclosing the two gears, one or more reciprocating cutting blades, and means for interconnecting the large gear so as to reciprocatingly drive one or more of the cutting blades. A hedge trimmer of the above type is disclosed in U.S. Pat. No. 3,200,493 to Dodegge.

It may be advantageous to form the gear box housing from plastic to reduce the cost of manufacturing the hedge trimmer. However, the use of plastic for the internal housing(s) of the hedge trimmer presents a problem. During operation of a hedge trimmer, internal forces and/or shocks generated within the hedge trimmer tend to cause the two gears to become misaligned with respect to each other, particularly when the hedge trimmer blades become temporarily jammed due to the cutting of a relatively large branch, for example.

These forces and/or shocks, referred to herein as gear-separation forces, along with the heat generated within the hedge trimmer during normal operation, may cause the plastic gear box housing to deform to such an extent that the two gears within the gear box housing become disengaged, resulting in the hedge trimmer becoming inoperable. Even if the two gears do not become disengaged, misalignment of the gears may result in undue wear of the gears, thus limiting the operational life of the hedge trimmer.

SUMMARY OF THE INVENTION

The present invention avoids or minimizes the above disadvantages by ensuring, in one aspect of the invention, that the two gears of the hedge trimmer drive assembly remain in a fixed positional relationship with respect to each other.

In accordance with this aspect, the invention is directed to a hedge trimmer having a housing, a motor disposed in the housing and having a rotatable drive shaft, and a drive assembly associated with the motor. The drive assembly has a first housing, a first gear which is connected to the rotatable drive shaft, a second housing, a second gear in contact with the first gear so that the second gear rotates when the first gear rotates, and a support connector disposed in contact with the first and second housings. The support connector causes the first and second housings to maintain a fixed positional relationship to ensure that the first and second gears remain in contact. The hedge trimmer further includes a first cutting blade operatively coupled to the second gear so that the first cutting blade reciprocates when the second gear rotates and a second cutting blade movable relative to the first cutting blade.

The support connector may include a first portion which is disposed about the central axis of the motor drive shaft and a second portion connected to the first portion and being disposed about the central axis of the second gear. The support connector may additionally include a bushing, disposed in the second portion, in which the gear shaft of the second gear is rotatably supported.

The first and second housings of the drive assembly are preferably composed of a non-metal material, such as plastic, and the support connector is preferably composed of metal, such as steel. Because the support connector is composed of metal, which will not substantially deform due to heat generated during normal operation of the hedge trimmer, the positional integrity of the hedge trimmer gears is maintained.

In another aspect of the invention, misalignment of the two hedge trimmer gears due to gear-separation forces is prevented with the use of a gear-travel limit member. In accordance with this aspect, the invention is directed to a hedge trimmer having a drive assembly with a gear box housing, a first gear associated with the gear box housing and being connected to the rotatable drive shaft of the motor, a second larger gear associated with the gear box housing and being provided in contact with the first gear so that the second gear rotates when the first gear rotates. The drive assembly also includes a gear-travel limit member, disposed adjacent a face of the second gear towards the outer periphery of the second gear, to limit temporary displacement of the second gear due to gear-separation forces in order to prevent any substantial misalignment of the second gear with respect to the first gear.

These and other features and advantages of the present invention will be apparent to those of ordinary skill in the art in view of the detailed description of the preferred embodiment, which is made with reference to the drawings, a brief description of which is provided below.

DETAILED DESCRIPTION OF THE PREFERRED EMBODIMENTS

Figure 1:
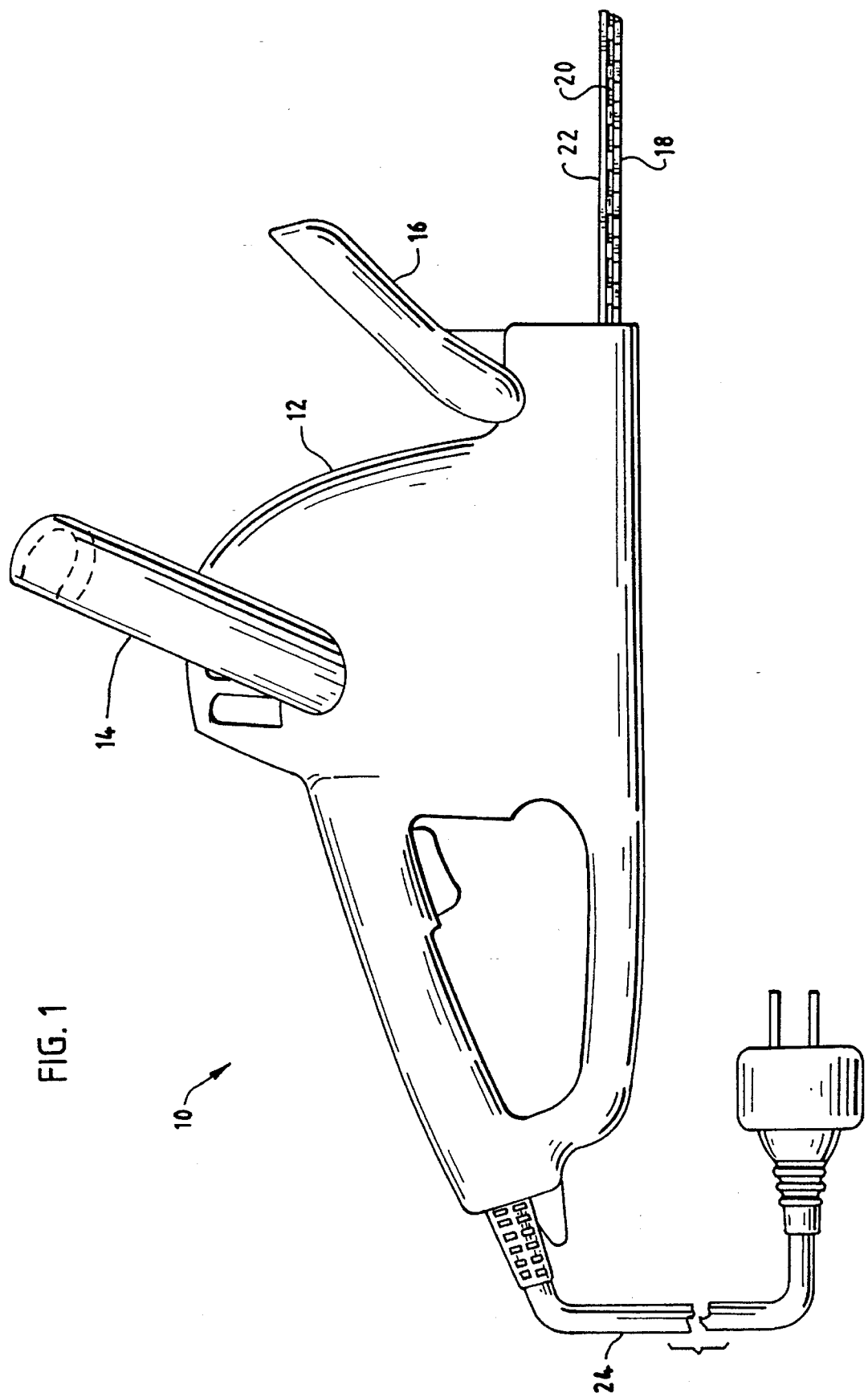
FIG. 1 illustrates a hedge trimmer in accordance with the invention.

A hedge trimmer 10 in accordance with the invention is shown in FIG. 1. The hedge trimmer 10 has a housing 12, a handle 14 attached to the housing 12, a shield 16 attached to the housing 12, and a number of operating elements in the form of three blades 18, 20, 22 which extend from the interior of the housing 12. Although the hedge trimmer 10 shown in FIG. 1 is shown with an electrical power cord 24, the hedge trimmer 10 could also be gasoline-powered.

Figure 2:
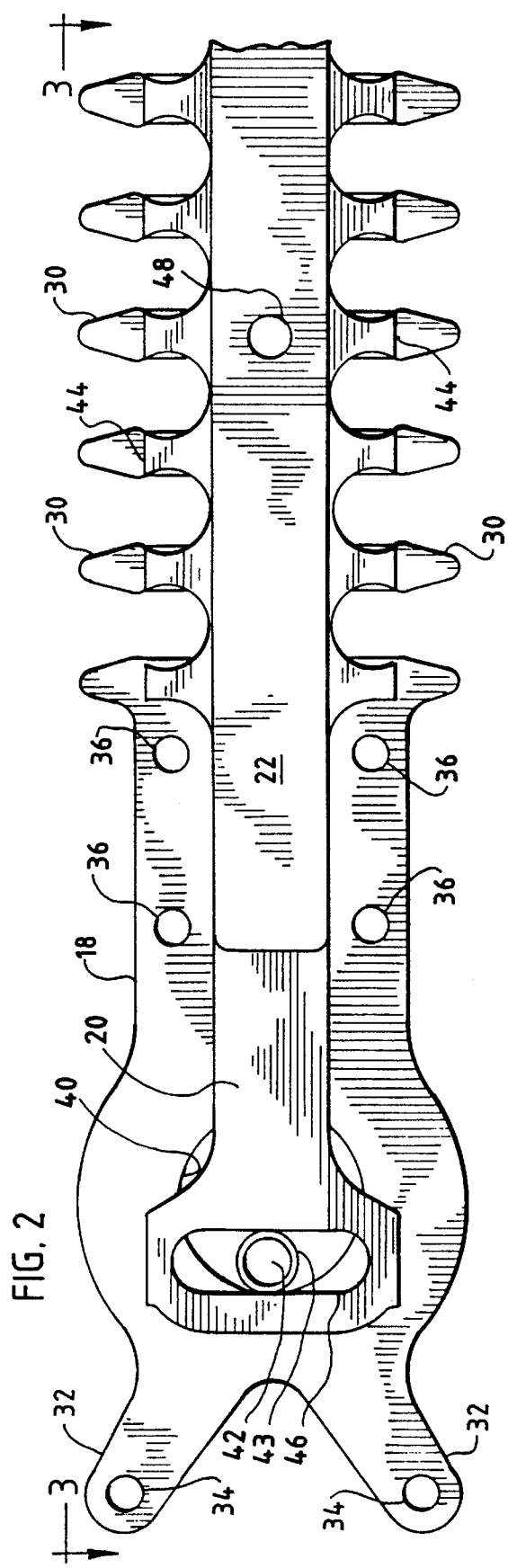
FIG. 2 is a top view of the cutting blades of the hedge trimmer taken along lines 2—2 of FIG. 4.
Figure 3:
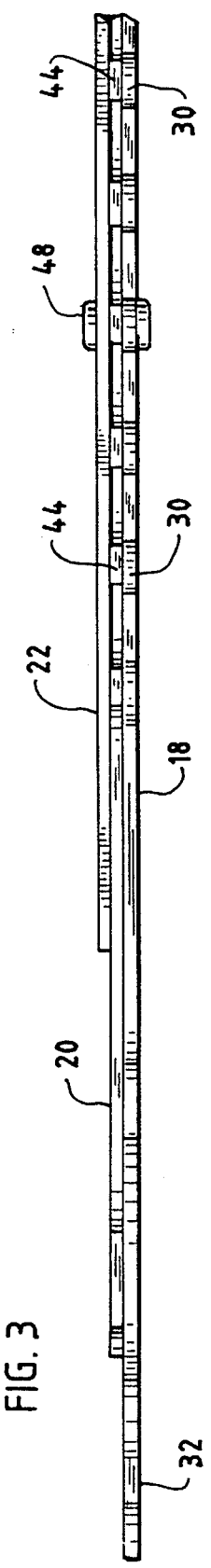
FIG. 3 is a side view of the cutting blades taken along lines 3—3 of FIG. 2.

Referring to FIGS. 2 and 3, the blades 18, 20, 22 are shown in more detail. The blade 18 is a stationary cutting blade having a plurality of pointed teeth 30 and a pair of connecting arms 32 each having a mounting hole 34 formed therein, and additional mounting holes 36, for fixably attaching the blade 18 to the housing 12.

The stationary cutting blade 18 has a circular hole 40 formed therein through which a blade-driving pin 42 extends. A cylindrical bushing 43 is rotatably connected about the blade-driving pin 42 via any conventional means, such as a flat retaining ring 45 (shown in FIG. 4) disposed within an annular slot (not shown) formed in the pin 42.

The blade 20 is a movable cutting blade having a plurality of flat-edged cutting teeth 44 and a slot 46 formed therein. The blade-driving pin 42 extends through the slot 46 and causes the movable blade 20 to reciprocate back and forth when the driving pin 42 moves in a circular path.

The blade 22 is a fixed retainer blade which is attached to the other two blades 18, 20 via a plurality of rivets 48 which extend through all three blades 18, 20, 22. A slot (not shown) parallel to the longitudinal axis of the movable cutting blade 20 is formed in the blade 20 at each rivet 48 to allow the movable blade 20 to reciprocate back and forth.

Although shown to be stationary, the cutting blade 18 is movable relative to the reciprocating cutting blade 20. The invention could also be used in connection with a hedge trimmer in which both of the cutting blades 18, 20 reciprocate.

The three blades 18, 20, 22 are preferably composed of steel. The stationary cutting blade 18 and the retainer blade 22 may be heat-treated to an RC hardness between 27 and 33 to prevent undue wear, and the movable cutting blade 20 may be heat-treated to an RC hardness of between 35 and 42. The two linear areas of the movable cutting blade 20 directly adjacent the two straight edges of the slot 46 may be heat treated to a higher RC hardness of between 50 and 65.

Figure 4:
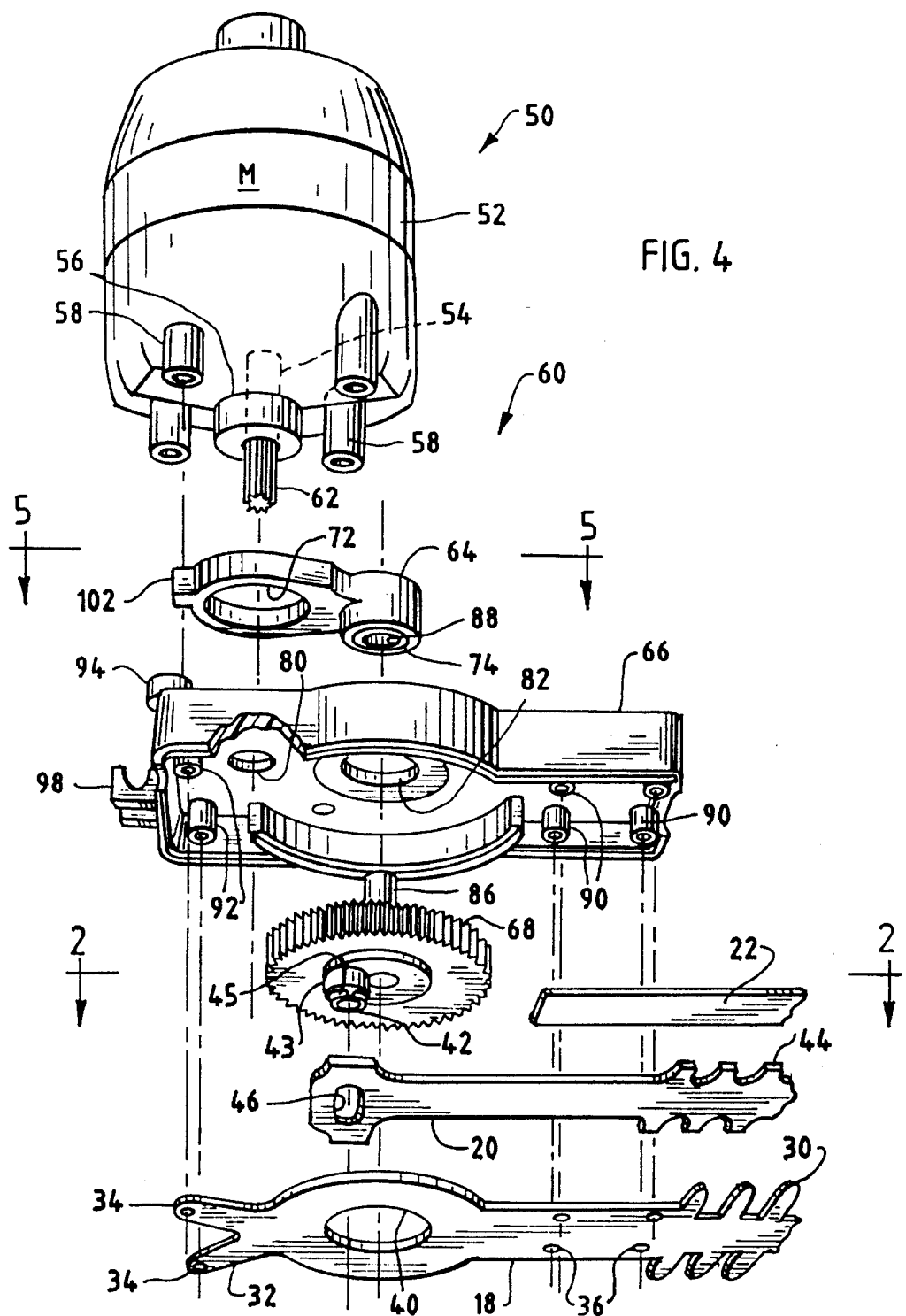
FIG. 4 is an exploded perspective view of a motor, a first embodiment of a drive assembly, and a portion of the cutting blades of the hedge trimmer.

Referring to FIG. 4, an electrical motor 50 is disposed inside the housing 12 of the hedge trimmer 10. The motor 50 has a motor housing 52, a rotatable drive shaft 54 which is coaxial with a cylindrical housing member 56 integrally formed with the motor housing 52, and four connecting bosses 58 which extend from the motor housing 52.

A drive assembly 60 is operatively connected to the drive shaft 54 of the motor 50 so that the rotation of the drive shaft 54 reciprocatingly drives the cutting blade 20. The drive assembly 60 includes a gear 62 attached to the drive shaft 54, a support connector 64, a gear box housing 66, and a second gear 68 having a larger diameter than the gear 62.

The support connector 64 has a first portion in which a cylindrical bore 72 is formed and a generally cylindrical second portion in which a hollow cylindrical bushing 74 is disposed. The cylindrical housing member 56 of the motor housing 52 is disposed within the bore 72 formed in the support connector 64, and the bore 72, which is centered along the central axis of the drive shaft 54, is sized so that there is a tight fit between the interior of the bore 72 and the exterior of the housing member 56.

The gear box housing 66 has a first bore 80 formed therein through which the gear 62 extends and a second bore 82 formed therein in which the cylindrical second portion of the support connector 64 is disposed. The gear 68 is fixed to a cylindrical gear shaft 86 which is supported for rotation within a central bore 88 formed in the bushing 74. The blade-driving pin 42 is fixed within a cylindrical bore (not shown) in the gear 68, and the pin 42 extends below the underside of the gear 68 and into the slot 46 in the cutting blade 20.

Four connecting bosses 90 integrally formed with the gear box housing 66 are positioned coincident with the four holes 36 in the cutting blade 18 to facilitate connection of the cutting blade 18 to the gear box housing 66. Two connecting bosses 92 are similarly formed and positioned coincident with the two mounting holes 34 in the connecting arms 32.

Figure 5:
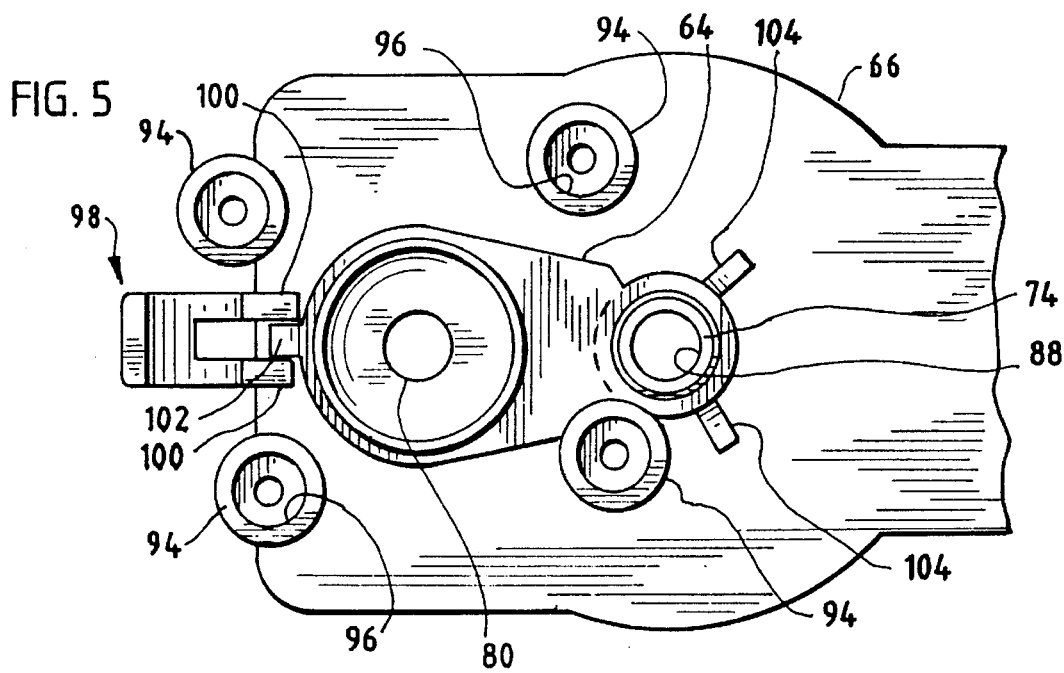
FIG. 5 is a top view of a portion of the drive assembly of FIG. 4 taken along lines 5—5 of FIG. 4.

Referring to FIG. 5, the upper side of the gear box housing 66 is shown to include four female connectors 94, each of which has a cylindrical bore 96 formed therein to receive a respective one of the four connecting bosses 58 (shown in FIG. 4). The gear box housing 66 also has a positioning member 98 formed integrally therewith. The positioning member 98 has a pair of upwardly extending arms 100 between which an extension 102 of the support connector 64 is held. The support connector 64 also has a second pair of positioning arms 104 which abut the cylindrical second portion of the support connector 64.

Referring back to FIG. 4, the gear box housing 66 may be provided with a generally flat gear box cover (not shown) having an outer contour which is substantially the same as the outer contour of the gear box housing 66. The gear box cover may have a raised circular portion, corresponding with the circular area through which the pin 42 rotates, so that the height of the gear box 66 is slightly greater over the area corresponding to the raised circular portion.

The motor housing 52 and the gear box housing 66 are preferably composed of plastic, whereas the support connector 64 is preferably composed of metal, such as steel. The gear box cover (not shown) may be composed of metal. The gears 62, 68 and the blade driving pin 42 are preferably composed of steel.

In operation, the motor 50 rotatably drives the drive shaft 54 and the gear 62. The larger gear 68, due to its being in contact with the gear 62, also rotates. Rotation of the gear 68 causes the blade-driving pin 42 to move in a circular path. The circular movement of the driving pin 42, which is disposed within the slot 46 formed in the cutting blade 20, causes the cutting blade 20 to reciprocate back and forth to provide the desired relative movement between the two cutting blades 18, 20.

The support connector 64 tightly holds the cylindrical member 56 of the motor housing 52, and thus the gear 62, in a fixed position with respect to the shaft 86 of the gear 68. Because the support connector 64 is composed of metal, which will not substantially deform during normal operation of the hedge trimmer 10, the positional integrity of the gears 62, 68 is maintained.

Figure 6:
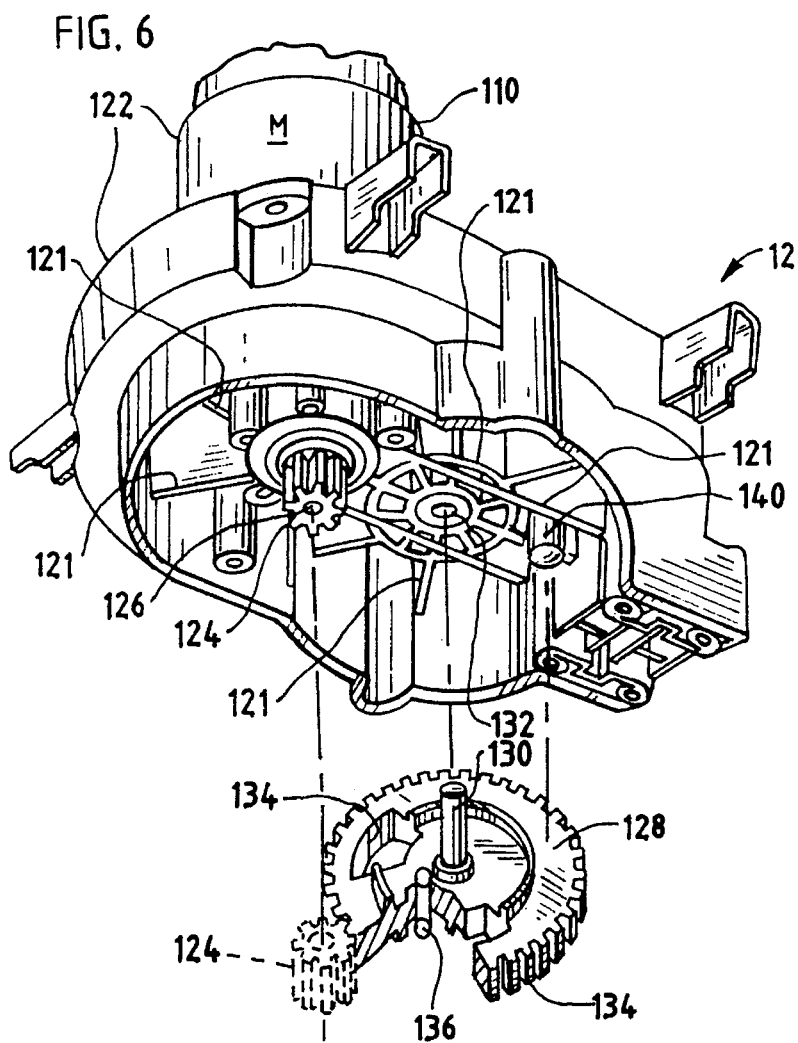
FIG. 6 is an exploded perspective view of a second embodiment of a drive assembly of the hedge trimmer.
Figure 7:
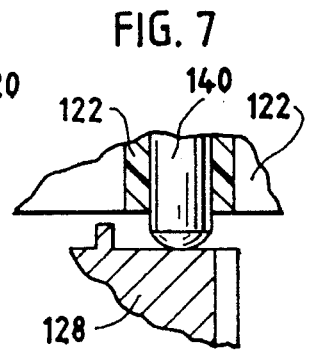
FIG. 7 is a cross-sectional view of a portion of the drive assembly of FIG. 6.

A second embodiment of a drive assembly 120, which may be used where the hedge trimmer 10 is gasoline-powered, is illustrated in FIG. 6. Referring to FIG. 6, a motor 110 schematically shown at 110, which may be gasoline-powered, is connected to the drive assembly 120 via a unitary plastic gear box housing 122. The housing 122 has a number of internal structures or ribs 121 for providing increased stiffness.

A first relatively small gear 124 is disposed within the gear box housing 122 and connected to a rotatable drive shaft 126 of the motor 110. A second gear 128 having relatively large diameter is fixed to a gear shaft 130 which is rotatably supported within a bearing 132 so that the teeth of the two gears 124, 128 are in contact.

As is conventional, when the drive assembly 120 is used to reciprocate a single cutting blade (some hedge trimmers reciprocate both cutting blades), the second gear 128 may have one or more apertures or windows 134 formed in one of its halves so that the gear 128 acts as a counterweight to the movement of the single reciprocating cutting blade.

A blade-driving pin 136 is fixed within a bore in the gear 128 and drives the reciprocating cutting blade 20 in the manner described above. A gear-travel limit member, in the form of a metal rod or pin 140, is fixed within the interior of the gear box housing 122 adjacent the upper face of the gear 128 towards the outer periphery of the gear 128.

During operation of the hedge trimmer, the limit member 140 limits temporary horizontal displacement of the gear 128 due to gear separation forces in order to prevent any substantial misalignment of the gear 128 with respect to the gear 124. The limit member 140 also prevents the gear 128 from coming into contact with the interior of the housing 122.

The limit member 140 may be disposed so that it rides lightly on the surface of the gear 128 during normal operation. Alternatively, the end of the limit member 140 may be spaced slightly from the surface of the gear 128 during normal operation, such as 0.01 to 0.05 inches, so that the gear 128 only makes temporary contact with the limit member 140 when the hedge trimmer is subjected to shocks resulting the cutting of relatively large branches and the like.

Figure 8:
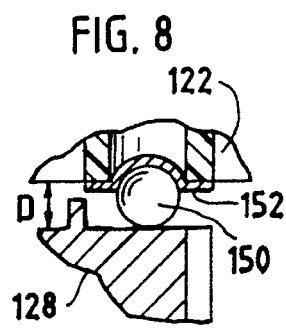
FIG. 8 is a cross-sectional view of an alternative embodiment of a portion of the drive assembly of FIG. 6.

An alternative embodiment of a gear-travel limit member, in the form of a rolling bearing, such as a ball 150, disposed in a metal retainer cup 52 fixed to the housing 122, is shown in FIG. 8. The ball 150 is held loosely within the retainer cup 152 and is retained in the cup 152 since the vertical distance D between the top face of the gear 128 and the bottom of the housing 122 shown in FIG. 8 is less than the diameter of the ball 150, as indicated by the arrow in FIG. 8. The ball 150 may be greased to reduce its rolling resistance within the retainer cup 152.

Although the two embodiments of the drive assemblies have been described in connection with a hedge trimmer, the drive assemblies could be utilized in other power tools. While the support connector 64 is shown to have a particular structure, other structures, such as a metal plate, could be utilized.

Modifications and alternative embodiments of the invention will be apparent to those skilled in the art in view of the foregoing description. This description is to be construed as illustrative only and is for the purpose of teaching those skilled in the art the best mode of carrying out the invention. The details of the structure may be varied substantially without departing from the spirit of the invention, and the exclusive use of all modifications which come within the scope of the appended claims is reserved.

What is claimed is:

1. A hedge trimmer, comprising:

a hedge trimmer housing;

a motor disposed in said hedge trimmer housing, said motor having a rotatable drive shaft;

a drive assembly associated with said motor, said drive assembly comprising:

a first housing;

a first gear associated with said first housing, said first gear being connected to said rotatable drive shaft;

a second housing;

a second gear associated with said second housing, said second gear being in contact with said first gear so that said second gear rotates when said first gear rotates; and a support connector disposed in contact with said first and second housings, said support connector causing said first and second housings to maintain a fixed positional relationship to ensure that said first and second gears remain in contact;

a first cutting blade operatively coupled to said second gear so that said first cutting blade reciprocates when said second gear rotates;

a second cutting blade movable relative to said first cutting blade.

2. A hedge trimmer as defined in claim 1 wherein said rotatable drive shaft has a central axis, wherein said second gear has a central axis, and wherein support connector comprises:

a first portion which is disposed about said central axis of said rotatable drive shaft; and a second portion connected to said first portion, said second portion being disposed about said central axis of said second gear.

3. A hedge trimmer as defined in claim 2 additionally comprising a rotatable member connected to said second gear, wherein said support connector additionally comprises a bushing disposed in said second portion, said bushing having a central aperture, said rotatable member being disposed in said aperture in said bushing.

4. A hedge trimmer as defined in claim 1 wherein said first and second housings comprise a non-metal material.

5. A hedge trimmer as defined in claim 1 wherein said first and second housings comprise plastic.

6. A hedge trimmer as defined in claim 1 wherein said first and second housings comprise plastic and wherein said support connector comprises metal.

7. A hedge trimmer as defined in claim 1 wherein said motor comprises an electric motor.

8. A hedge trimmer as defined in claim 1 wherein said second cutting blade is fixed.

9. A hedge trimmer as defined in claim 1 wherein said first cutting blade is operatively coupled to said second gear via a pin fixed with respect to said second gear, said pin being disposed for slidable movement within a slot formed in said first cutting blade.

10. A drive assembly adapted for a power tool having a housing, a motor disposed in said housing and having a rotatable drive shaft, and at least one operating element, said drive assembly comprising:

a first housing;

a first gear associated with said first housing, said first gear being connected to said rotatable drive shaft;

a second housing;

a second gear associated with said second housing, said second gear being in contact with said first gear so that said second gear rotates when said first gear rotates; and a support connector disposed in contact with said first and second housings, said support connector causing said first and second housings to maintain a fixed positional relationship to ensure that said first and second gears remain in contact, wherein said rotatable drive shaft has a central axis, wherein said second gear has a central axis, and wherein said support connector comprises: a first portion which is disposed about said central axis of said rotatable drive shaft; and a second portion connected to said first portion, said second portion being disposed about said central axis of said second gear.

11. A drive assembly as defined in claim 10 additionally comprising a rotatable member connected to said second gear, wherein said support connector additionally comprises a bushing disposed in said second portion, said bushing having a central aperture, said rotatable member being disposed in said aperture in said bushing.

* * * * *